Patented Feb. 16, 1932

1,845,744

UNITED STATES PATENT OFFICE

ALEXANDER FLECK, OF NORTON-ON-TEES, ENGLAND, ASSIGNOR TO IMPERIAL CHEMICAL INDUSTRIES LIMITED, OF LONDON, ENGLAND, A BRITISH COMPANY

PRODUCTION OF QUICKLIME AND SULPHUR DIOXIDE

No Drawing. Application filed April 19, 1930, Serial No. 445,832, and in Great Britain May 9, 1929.

This invention relates to the production of quicklime by strongly heating a calcinable lime compound (calcium sulphate or carbonate).

It is known that quicklime can be obtained by strongly heating calcium sulphate in direct contact with combustion gases, but that this process suffers from the disadvantage that to secure complete decomposition of the sulphate and a high output very high temperature must be used, with the attendant danger of obtaining "dead-burnt" lime. To avoid the production of dead-burnt lime it has been proposed to mix the charge of calcium sulphate with carbon, whereby the temperature necessary for the production of quicklime is diminished. We have now found that quicklime and sulphur dioxide can readily be obtained from calcium sulphate without the admixture of carbon and without the production of calcium sulphide, by directly heating the material with a reducing gas flame at temperatures between 1050° and 1300°. Thus gypsum or anhydrite may be fed into a rotary kiln in the interior of which a reducing gas flame is maintained by admitting a suitable gas, e. g. coal gas, producer gas, etc. together with an insufficient amount of air for its complete combustion. The gases escaping from the kiln contain sulphur dioxide which may be recovered in known manner. The temperatures employed for the production of high-grade quicklime under these conditions are preferably between 1150 and 1250° C. at which temperatures no appreciable danger of forming dead-burnt lime exists. It is essential that a reducing atmosphere be maintained in the reaction zone as the presence of free oxygen necessitates the use of such a high temperature in order to get complete decomposition that dead burnt lime is formed.

The time necessary for the completion of the reaction depends on the temperature employed and the size of the calcium sulphate employed. Thus, whereas anhydrite in 1 inch pieces at 1150° C. required about 6 hours burning, and at 1250° C. only required about 4 hours, finely ground anhydrite at 1150° C. only required about 3 hours.

By this process it is therefore possible to obtain high-grade quicklime together with sulphur dioxide suitable for such purposes as the manufacture of sulphuric acid.

A further feature of our invention consists in the treatment in the above described manner of calcium carbonate containing appreciable amounts of a sulphate. Thus for instance, by product chalk obtained in the manufacture of ammonium sulphate from ammonia, carbon dioxide and gypsum, contains ammonium, and calcium sulphates and if this material is calcined in the usual manner the resultant lime has a high sulphate content. By calcining however in the manner of the present invention, good quality lime is obtained having a much reduced sulphate content.

Example 1

A sample of anhydrite containing 90 per cent. $CaSO_4$ and 22 per cent $CaCO_3$ was finely ground and fed into a rotary kiln and burnt in a flame fed with water gas in excess. The calcining occupied a period of 3½ hours at a temperature of 1150° C. and the lime obtained gave on analysis

| | |
|---|---|
| Free CaO | 84.0% |
| $CO_2$ | Nil. |
| $CaSO_4$ | .68% |
| CaS | .16% |

Example 2

Calcium carbonate containing about 4 per cent of sulphate radical was burnt in a reducing atmosphere at a temperature of 1250° C. for a period of 3 hours. The sulphate content of the resulting lime was found to be reduced to .2 per cent.

I declare that what I claim is:—

1. Process for producing quicklime and sulphur dioxide which consists in heating a calcinable substance containing calcium sulphate in a reducing flame to 1150–1250° C. whereby the production of dead burnt lime is avoided.

2. Process for producing quicklime and sulphur dioxide which consists in heating calcium sulphate in a reducing flame to 1150–1250° C. whereby the production of dead burnt lime is avoided.

3. Process for producing quicklime and sulphur dioxide which consists in heating a mixture of calcium carbonate and calcium sulphate in a reducing flame to 1150–1250° C. whereby the production of dead burnt lime is avoided.

In witness whereof, I have hereunto signed my name this 7th day of April, 1930.

ALEXANDER FLECK.